(12) United States Patent
Maddox et al.

(10) Patent No.: US 7,150,624 B1
(45) Date of Patent: Dec. 19, 2006

(54) SEALING BLADE

(75) Inventors: A. Dale Maddox, Tecumseh, MI (US); Fred A. Loesch, Britton, MI (US)

(73) Assignee: Uniloy Milacron Inc., Tecumseh, MI (US)

( * ) Notice: Subject to any disclaimer, the term of this patent is extended or adjusted under 35 U.S.C. 154(b) by 0 days.

(21) Appl. No.: 09/578,810

(22) Filed: May 24, 2000

(51) Int. Cl.
 *B29C 49/42* (2006.01)
(52) U.S. Cl. ..................................... 425/525
(58) Field of Classification Search ............. 425/522, 425/525, 524; 264/524, 525, 533
 See application file for complete search history.

(56) References Cited

U.S. PATENT DOCUMENTS

| | | | |
|---|---|---|---|
| RE23,564 E * | 10/1952 | Hobson | |
| 3,423,495 A * | 1/1969 | Bachner | |
| 3,424,829 A * | 1/1969 | Peters et al. | |
| 3,464,085 A * | 9/1969 | Burkett et al. | |
| 3,814,783 A | 6/1974 | Dardaine et al. | 425/527 |
| 3,939,623 A | 2/1976 | Shine et al. | 53/440 |
| 4,123,217 A * | 10/1978 | Fischer et al. | 425/525 |
| 4,266,927 A * | 5/1981 | Gilbert et al. | 425/524 |
| 4,948,356 A | 8/1990 | Dundas et al. | 425/522 |
| 4,950,153 A | 8/1990 | Dundas et al. | 425/536 |
| 5,022,544 A | 6/1991 | Dundas et al. | 215/40 |
| 5,037,684 A | 8/1991 | Dundas et al. | 428/36.92 |
| 5,054,267 A | 10/1991 | Dundas | 264/524 |
| 5,054,272 A | 10/1991 | Dundas | 425/525 |
| 5,068,075 A | 11/1991 | Dundas et al. | 425/525 |
| 5,256,341 A | 10/1993 | Denis et al. | 425/174.4 |

FOREIGN PATENT DOCUMENTS

| | | |
|---|---|---|
| CA | 1333056 | 11/1994 |
| DE | 3128001 A1 | 4/1982 |
| FR | 2.183.573 | 12/1973 |

\* cited by examiner

*Primary Examiner*—Robert B. Davis
(74) *Attorney, Agent, or Firm*—Brinks Hofer Gilson & Lione

(57) ABSTRACT

A sealed bottle, a sealing method and an apparatus for blow molded aseptic bottles are disclosed. A sealing tool, having two integral blades, laterally displaces one side against the opposing side of an inflated parison. The sealing tools forms a seal which includes of a pair of indentations in collapsed portion of the parison, and a build-up material forming a dam therebetween.

7 Claims, 4 Drawing Sheets

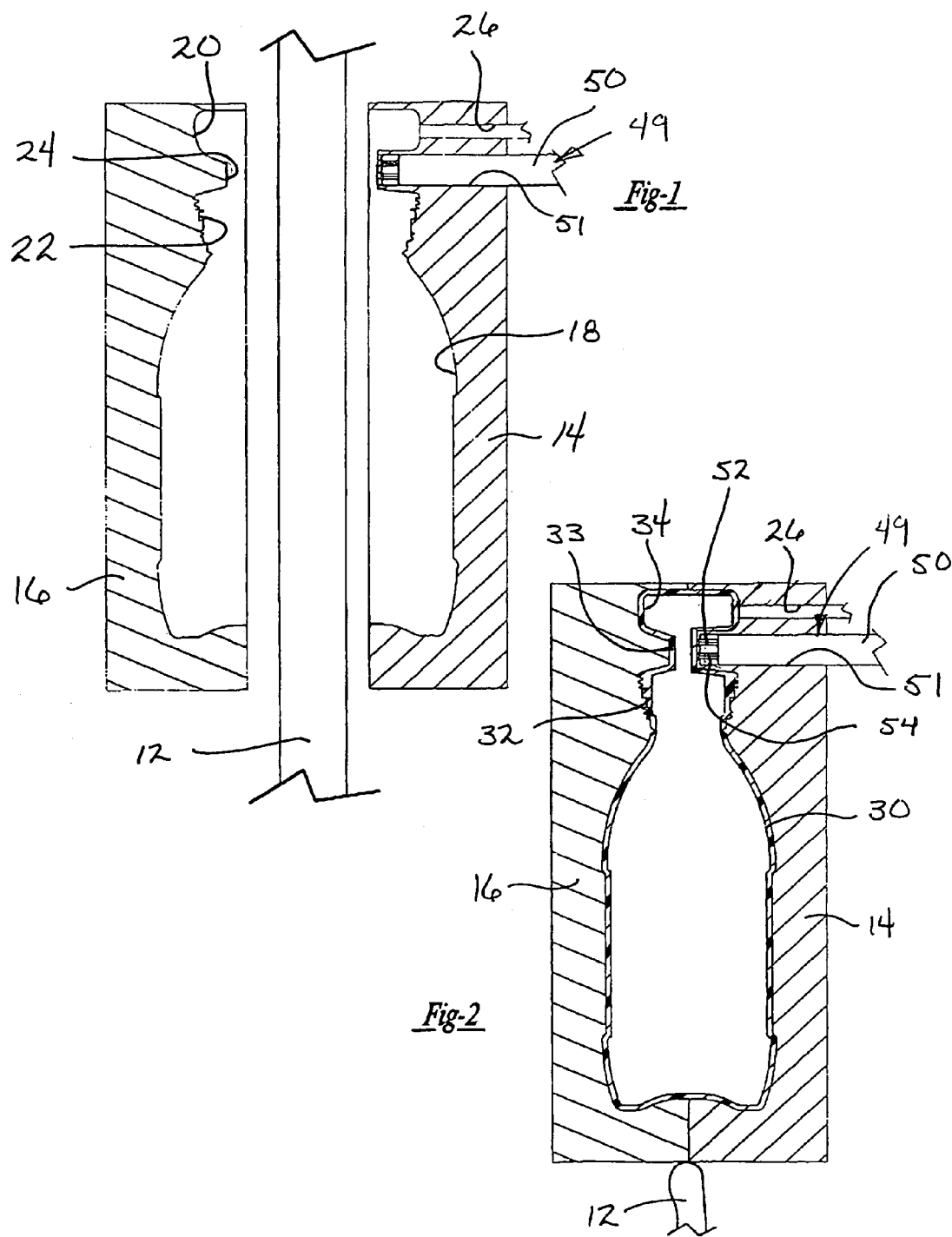

SEALING BLADE

BACKGROUND OF THE INVENTION

This invention relates to blow molded sealed aseptic bottles, a method for blow molding sealed aseptic bottles and an apparatus for sealing blow molding aseptic bottles.

Conventional aseptic bottles are blow molded using high pressure sterile air. The high pressure sterile air is vented and then the bottles are either sealed in the mold or the molded bottles are filled and sealed immediately after being molded so as to assure the sterility of the bottles and their contents. Often it is not practical to fill freshly molded sterile bottles. For example, there may be a time interval or travel distance between the blow molding operation and the filling operation.

Sealing blow molded aseptic bottles in the mold has met with limited success, requiring complicated tooling and processing and resulting in bottles that are fragile and prone to failure during transportation/storage prior to filling. Thus, there is a need for a simplified seal for aseptic bottles that is more rugged and employs less complex tooling. A rugged, simplified seal for aseptic bottles will assure that it can be stored for a sufficient period of time without damage to the seal or distortion to the aseptic bottle.

In achieving the above objectives and overcoming the limitations of the prior art, the present invention provides a sealing apparatus for blow molded bottles which includes a pair of mold halves that define a bottle cavity, first and second dome cavities and a passageway connecting the dome cavities. A sealing is removably mounted through one of the mold halves and is movable so as to be extended into the passageway. The tool includes a pair of spaced apart blades formed on its distal end. In a retracted position, the tool and its blades are substantially withdrawn from the passageway. In an extended position, the blades of the tool extend partway across the passageway to compress a portion of a blow molded parison therein and form a seal in which the vestiges of the pinch line are eliminated. In the seal achieved with the present invention, the two layers of the polymeric material become molecularly joined forming what is referred to herein as a molecular seal.

In another aspect, the present invention provides a bottle which includes a body portion formed with a first dome connected to a second dome by a collapsed passageway. The collapsed passageway forms a seal having one side of the passageway displaced laterally against the opposing side, thereby being collapsed, and further having defined therein, a pair of adjacent indentations in the thermoplastic resin.

In its final aspect, the present invention provides a method for forming a sealed, unfilled hollow aseptic container from a parison of thermoplastic material. The method includes the steps of introducing a molten parison between a pair of open mold halves, closing the mold halves to capture the parison in a mold cavity having the shape of a container; flowing pressurized air into the interior of the captured parison to expand the walls of the parison against the mold cavity thereby forming an expanded parison in the shape of the mold cavity; reducing the pressure within the expanded parison; and collapsing a portion of the expanded parison and forming at least one molecular seal in the collapsed portion.

BRIEF DESCRIPTION OF THE DRAWINGS

The various advantages of the present invention will become apparent to one skilled in the art upon reading the following specification and by reference to the drawings which include:

FIG. 1 is a cross-sectional view of a pair of open mold halves with a sealing tool according to the present invention;

FIG. 2 is a cross-sectional view, prior to sealing, of a blow molded aseptic bottle located within the mold prior to sealing;

DETAILED DESCRIPTION OF THE PREFERRED EMBODIMENT

Figure 3:
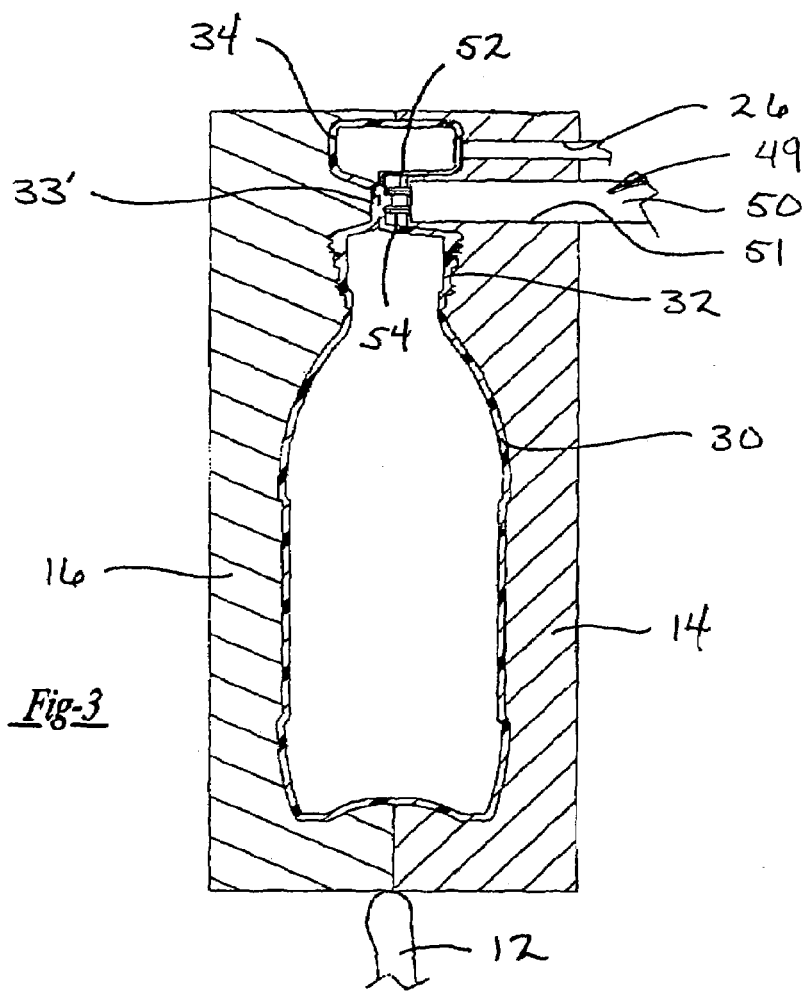
FIG. 3 is a cross-sectional view similar to FIG. 2 of a sealed aseptic bottle.

Referring now to the drawings, extrusion blow molded plastic container bottles 30 are typically made from high density polyethylene resin although other suitable resins can be used. In forming such a bottle 30, a parison 12 of hot sterile resin is extruded between an open pair of complimentary mold halves 14, 16 as shown in FIG. 1. The mold halves include surfaces defining a bottle cavity 18, blow dome recess 20 and spin dome recess 22. A blow channel 24 connects the blow dome recess 20 to the spin dome recess 22. The spin dome recess 22 is formed immediately above the bottle cavity 18.

When the molds 14, 16 are closed and the parison is blow molded, as shown in FIG. 2, the cavity 18, recesses 20, 22 and channel 24 in the mold halves 14, 16 form the inflated parison 12 into a bottle 30 that includes an integral spin dome 32 and blow dome 34, the blow dome 34 located above the spin dome 32 and being connected thereto by a blow passage 33. One mold half 14 includes a blow needle passage 26 which extends to the blow dome cavity 20. A needle (not shown), connected to a source of sterile blow air through an appropriate valving system, is coupled to a drive mechanism that moves the needle back and forth between a retracted position and an extended position. In the extended position, the needle tip pierces into the parison 12 within the blow dome cavity 20. The bottle 30 and associated structures are then blow molded and the pressurized blow air is exhausted, reducing the pressure in the mold to a negative pressure (about negative 10–20 inches of water).

Figure 4:
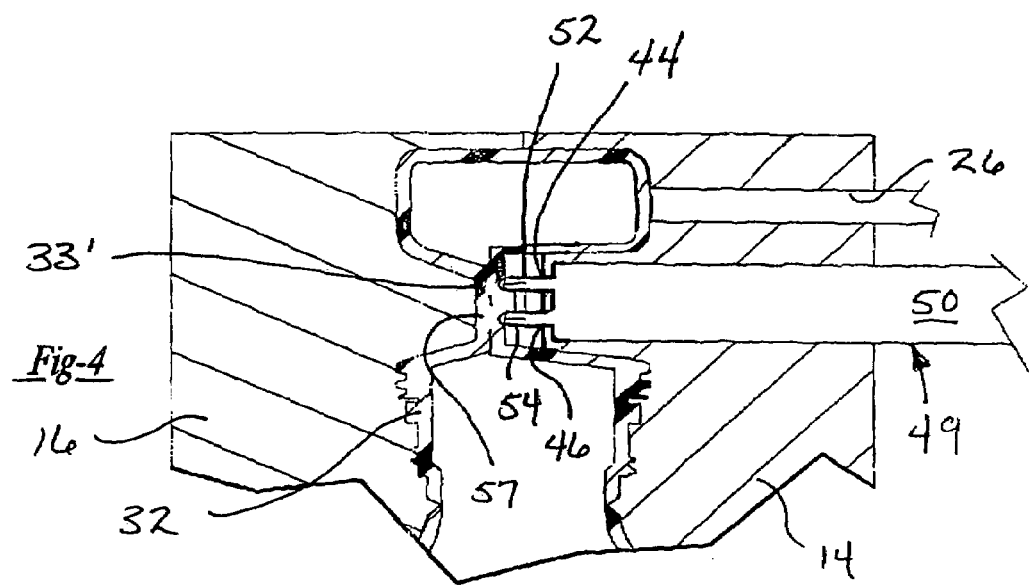
FIG. 4 is an enlarged view of the extended tool for sealing the aseptic bottle.

Once reaching the appropriate negative pressure, a sealing tool 49, which is mounted in the cavity in a passageway 51 in the mold half 14, is moved by a drive (not illustrated) to engage the blow passage 33 and seal the bottle 30 above the spin dome 32, as shown in FIGS. 3 and 4. The sealing tool 49 includes a bar 50 having a pair of integral blades 52, 54 which, when actuated, are extended into the material forming the blow passage 33. The passageway 51, within which the sealing tool 49 is mounted, locates the tool 49 at a right angle to the blow passage 30. The blades 52, 54 are integrally formed with the sealing tool 49, extend through ports 44, 46 in the end of passage 51, and are longitudinally spaced apart along the blow channel 24 to assure the formation of a seal according to this invention.

The sealing tool 49 is reciprocally driven by a drive mechanism 27, which can be pneumatic, electric or mechanical. The bar 50 itself is formed of a round shaft with the two sealing blades 52, 54 extending in a parallel but spaced apart relationship from its distal end. In the retracted position, the sealing tool 49 does not extend into the blow channel 24, but the tips 56, 58 of the blades 52, 54 are positioned in the ports 44, 46 adjacent to the blow channel 24. The tips 56, 58 preferably do not extend past the surface forming the blow channel 24 adjacent to the tool 49 when the sealing tool 49 is in the retracted position.

As mentioned above, sterile blow air inflates the parison 12 against the walls of the mold halves 14, 16. The mold halves 14, 16 are cooled by water so that the skin of the inflated hot plastic in the cavities is quickly cooled to begin hardening and forming the blow dome 34, spin dome 32, blow passage 33 and bottle 30. While thermoplastic resin is a good insulator and it does not lose heat quickly, the surfaces forming in the blow channel 24 may optionally be fitted with heat retention inserts or plates to reduce the heat transfer from the blow channel 24 and aid in sealing of the blow passage 33.

Figure 8:
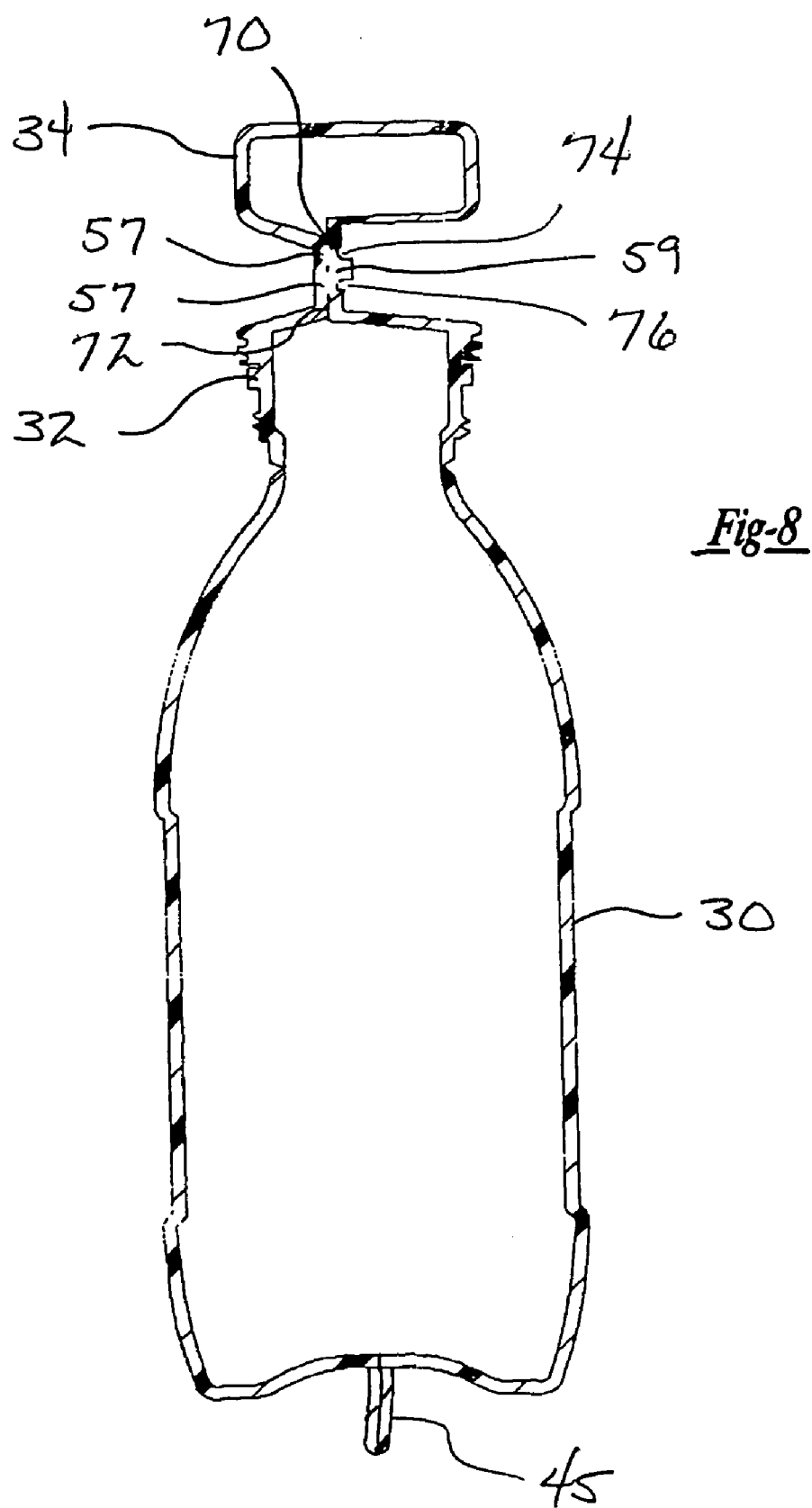
FIG. 8 is a sectional view of a sealed aseptic bottle according to the present invention.

As stated before, the sealing tool 49 is not actuated until there has been an appropriate reduction of pressure within the blown plastic body. The extension of the sealing tool 49 causes the sealing blades 52, 54 to protrude from the ports 44, 46 and enter the blow channel 24, pushing the thermoplastic resin of one side of the blow passage 33 toward the other side thereof. The tool 49 and blades 52, 54 continued to be advanced and cause the opposing sides of the blow passage 33 to collapse and adhere together forming a seal. With the sides of the blow passage 33 collapsed upon one another, the tool 49 is still further advanced until the blades 52, 54 protrude into the material now forming the collapsed blow passage 33'. This additional penetration eliminates or minimizes the existence of a pinch line between the opposing sides of the collapsed blow passage 33' and results in the material adjacent to this penetration being molecularly joined to create what is herein referred to as a "molecular seal 57" with a dam 59 of material built-up therebetween. This greatly enhances the integrity of the seal 90 and is best seen in FIGS. 3, 4 and 8.

Figure 5:
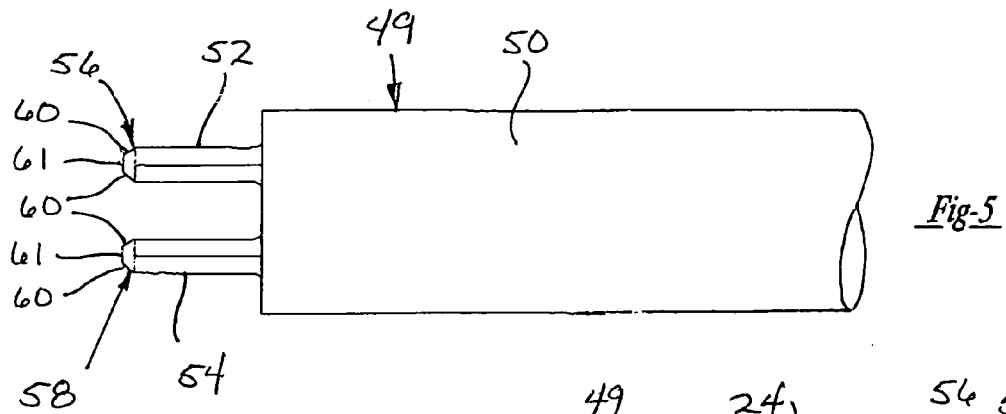
FIG. 5 is a side view of the sealing tool according to the present invention.
Figure 6:
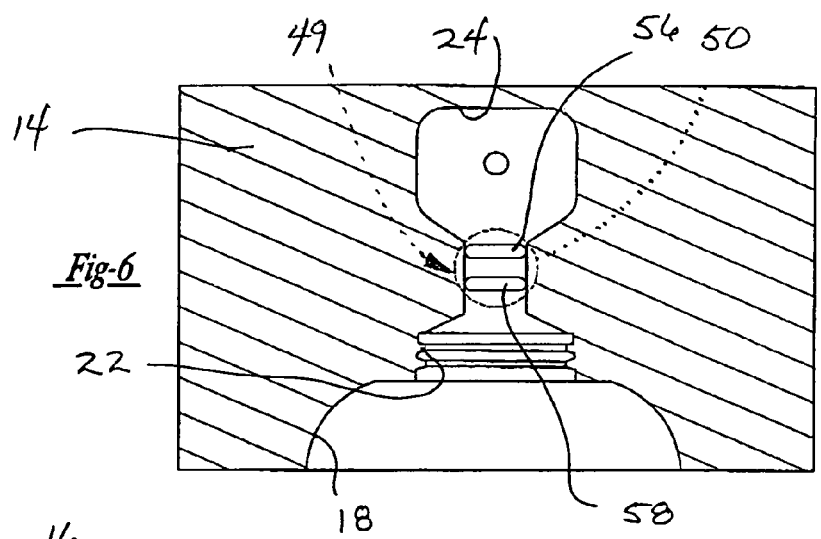
FIG. 6 is a side sectional view of an upper portion of the mold half with the sealing tool.
Figure 7:
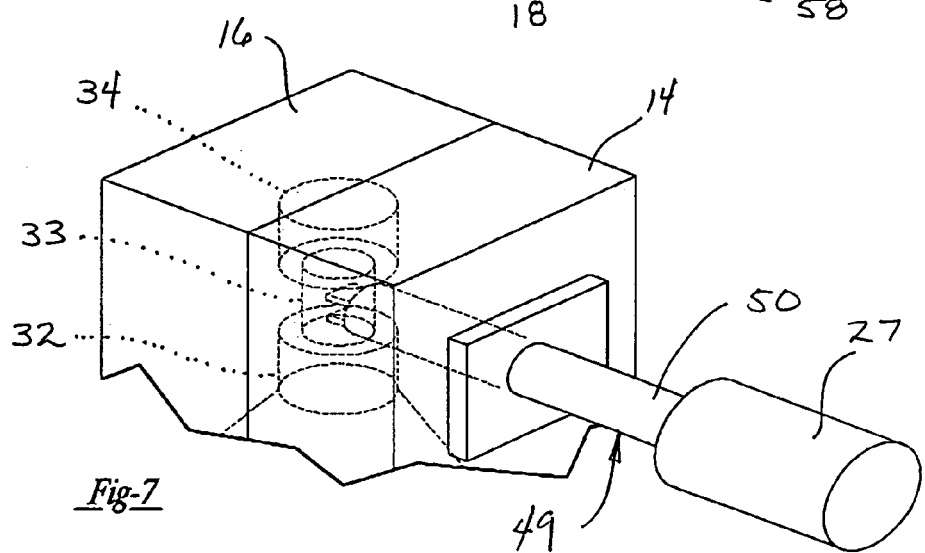
FIG. 7 is a perspective view of the tool in FIG. 6.

As seen in FIG. 5, the tips 56, 58 of the sealing blades 52, 54, respectively, are chamfered 60, 62 with a small, flat land 61 located centrally on each end. The lands 61 and chamfers 60 help force the material displacement during the extension of the sealing tool 49 and penetration of the blades 52, 54 into the material. The dam 59 is formed by pushing material of the collapsing blow passage 33 into the area between the blades 52, 54 as the tips of the blades 52, 54 penetrate the collapsed passageway 33'. The sealing tool 49 is left in the extended position until the collapsed and compressed molten plastic has cooled to the point where the tool 49 can be withdrawn without damage to the newly formed seals. Once the seals are formed, the sealing tool 49 is retracted back to the position shown in FIG. 2, the mold halves 14, 16 separate and the bottle 30 is removed from the mold cavity.

With the seal 90 is formed, the blow dome 34 can be removed without affecting the integrity of the seal 90 of the bottle 30. This reduces the potential of sending bacteria, molds and yeast, which might be present in the blow dome 34, to the filling system.

The step by step molding of bottle 30 from a sterile thermoplastic resin through an extrusion blow molding operation will now be described. The parison 12 is extruded between open mold halves 14, 16, as shown in FIG. 1. The mold halves are closed to capture a portion of the parison 12 within the bottle cavity 18, the spin dome recess 22, blow dome recess 24 and the blow channel 24. Upon closing, the mating surfaces of the mold halves 14, 16, cause the formation of flash 45 integral with the captured parison 12.

Once the mold halves 14, 16 have closed, the blow needle is extended through channel 26 into the cavity formed by the blow dome recess 24 until it punctures the confined parison. Sterile blow air, at a pressure of approximately 80–120 pounds per square inch, is caused to flow through the needle and into the parison 12 to inflate the parison against the surfaces of the mold halves 14, 16 to form the blow dome 34, the spin dome 32, the blow channel 33 and the bottle 30, all having a common interior. The blow air holds the expanded plastic in intimate contact with the walls of mold halves 14, 16 causing the plastic to begin to cool. The entire outer surface or skin of the bottle 30 and associated structures cools below the melt temperature of the thermoplastic resin and begins to harden.

During cooling of the plastic in the mold, the trapped blow air in the interior is heated by the plastic to about 200° to 250° F. Following cooling and setting of the bottle skin, the blow needle is withdrawn and the confined, pressurized and hot blow air is vented quickly, preferably to the atmosphere. At the same time, a valve (not shown) is opened and a large volume of pressurized air flows through a venturi (not shown). The remaining air flows rapidly out of the bottle interior.

Venting of the pressurized blow air from the bottle 30 in this manner reduces the pressure in the bottle interior to atmospheric pressure. Immediately after the pressure in the bottle falls to atmospheric pressure, the venturi quickly draws air from the interior of the bottle into the venturi and out to atmosphere, which reduces the pressure in the bottle below atmospheric pressure. Thus, the pressure in the bottle interior is at a pressure in the range of about a negative 10 to 25 inches of water. Those skilled in the art will recognize that pressure provided for in the bottle will depend on the specifics of the particular bottle including bottle thickness, geometry and parison temperature. Once the pressure of the interior of the bottle 30 is at the desired negative pressure, the sealing tool 49, as shown in FIG. 4, is actuated to extend the blades 52, 54 into the blow passage 33.

The tips 56, 58 of the blades 52, 54, respectively, first engage one side of the blow passage 33 and force the softened plastic material into sealing engagement with the material of the opposite side of the blow passage 33. The chamfered tips 56, 58 force the still formable thermoplastic resin into welded engagement with the layer of plastic on the opposite side of the blow passage 33 so as to form a seal. Further extension of the blades 52, 54 across the blow channel 24 and into contact with collapsed blow passage 33' causes penetration of the tips 56, 58 into the collapsed blow passage 33'. This penetration compresses the material and is to a depth in the material which eliminates or significantly reduces the presence of a pinch line between the opposing surfaces of the collapsed blow passage 33', resulting in molecular seals 57 being formed. Upper and lower pinch lines 70, 72 can be seen in FIGS. 3, 4 and 8 and are notably absent where penetration of the blades 52, 54 has occurred. Between the seals 57 a dam 59 of material is built-up as the chamfers 60 on the tips of the blades 52, 54 push material laterally during penetration. Optionally, the thickness of the parison may be increased in the vacinity of the blow channel 24 to provide additional thermoplastic resin for forming the seal.

As mentioned above, the mold halves 14, 16 may optionally have insulating inserts along the surfaces defining the blow channel 24, such inserts may be used in order to prevent the thermoplastic resin of the blow passage 33 from being cooled too quickly below the molding temperature of the resin.

Those skilled in the art will recognize that in the extended position of the tool 49, the tips 56, 58 push on or through the surface of the collapsed passage 33' by limiting the stroke of the tool 49. Depth of penetration 50 so as to form the indentations 74, 76 will depend on the specifics of a given application including the material type, molding temperature and thickness of expanded parison walls in the blow passage 33 area.

Once the seal 90 is formed, the sealing tool 49 is retracted to its initial position, the mold halves separate and the bottle 30 is ejected from the mold cavities 14, 16. As one skilled in the art will appreciate, the flash 45 and blow dome 34 can then be removed without affecting the integrity of the seal 90.

While the above preferred embodiment illustrates the invention, it is understood that this invention is capable of modification and therefore the invention is not limited to the precise detail set forth but falls within the changes and alterations that fall within the purview of the following claims.

What is claimed is:

1. An apparatus for in mold sealing of a bottle blow molded from a parison of thermoplastic resin, said apparatus comprising:

a pair of mold halves including surfaces that when closed define a cavity, first and second dome recesses, and a passageway connecting said first and second domes recesses; and a sealing tool movably mounted to one of said mold halves and being moveable to extend into said passageway, said tool having a pair of spaced apart blades formed on a distal end thereof, in a retracted position of said tool said blades being substantially withdrawn from said passageway, in an extended position of said tool said blades extending partway across said passageway to a position compressing and penetrating into a portion of a parison to form a seal with molecular sealing therein.

2. An apparatus as claimed in claim 1 wherein each of said blades includes a tip, said tip having chamfered sides.

3. An apparatus as claimed in claim 2 wherein said tip includes a central flat land between said chamfered sides.

4. An apparatus as claimed in claim 1 wherein said blades are transversely oriented relative to said passageway.

5. An apparatus as claimed in claim 1 wherein said tool is in said extended position said tips of said blades are positioned only partway across said passageway.

6. An apparatus as claimed in claim 1 further comprising a first actuator for closing and opening said mold halves, a second actuator for extending and retracting said tools and means for inflating said parison.

7. An apparatus as claimed in claim 1 wherein said blades are spaced longitudinally apart along said passageway.

* * * * *